United States Patent [19]
Miyauchi

[11] Patent Number: 5,761,733
[45] Date of Patent: Jun. 2, 1998

[54] DATA STORAGE DEVICE WITH SECURITY SYSTEM AND FERROELECTRIC DATA INPUT SECTION

[75] Inventor: Shigenori Miyauchi, Tokyo, Japan

[73] Assignee: Mitsubushi Denki Kabushiki Kaisha, Tokyo, Japan

[21] Appl. No.: 607,483

[22] Filed: Feb. 27, 1996

[30] Foreign Application Priority Data

Sep. 25, 1995 [JP] Japan ................... 7-245999

[51] Int. Cl.⁶ .................................................. G11C 7/00
[52] U.S. Cl. .................... 711/164; 711/103; 235/382.5; 365/145
[58] Field of Search ........................ 395/490, 491, 395/186, 430; 235/380, 382, 382.5, 381; 382/182, 188, 186; 365/109, 145, 108; 711/163, 164, 103

[56] References Cited

U.S. PATENT DOCUMENTS

| | | | |
|---|---|---|---|
| 4,158,201 | 6/1979 | Smith et al. | 345/84 |
| 4,614,861 | 9/1986 | Pavlov et al. | 235/380 |
| 4,654,829 | 3/1987 | Jiang et al. | 365/189.03 |
| 4,954,985 | 9/1990 | Yamazaki | 365/108 |
| 5,180,902 | 1/1993 | Schick et al. | 235/380 |
| 5,237,609 | 8/1993 | Kimura | 380/3 |
| 5,267,179 | 11/1993 | Butler et al. | 364/514 B |
| 5,377,343 | 12/1994 | Yaezawa | 395/491 |
| 5,418,029 | 5/1995 | Yamamoto et al. | 428/64.2 |
| 5,600,818 | 2/1997 | Weikmann | 395/490 |

FOREIGN PATENT DOCUMENTS 3-71290  8/1989  Japan .
08305815A  11/1996  Japan ............................ G06K 19/10

OTHER PUBLICATIONS

Kaufman, Alvin B., "Ferroelectric Memories for Security and Identification Purposes," IEEE Transactions on Electron Devices, vol. Ed.–16, No. 6, pp. 562–564, Jun. 1969.

Krueger, Julie, "Integrated Circuits for Smart Cards," 27th International SAMPE Technical Conference, vol. 27, pp. 1168–1171, Oct. 1995.

Bruyne, P. de, "Piezo–Electric Film as a Sensor Element in Signature Verification,"Electrets (ISE 6) Proceedings, 6th International Symposium on, IEEE Cat. No. 88CH2593-2, pp. 229–233, 1988.

*Primary Examiner*—Tod R. Swann
*Assistant Examiner*—Christopher S. Chow

[57] ABSTRACT

A data storage device such as a PC card connectable to a system equipment comprises a memory means for storing data, and a memory controller for controlling data transfer between the memory means and the system equipment. The device further comprises a security system and a data input section. The data input section comprises cells made of a ferroelectric material for inputting a matching data, and a user can give a matching data before connecting the device to a personal computer or the like. The data input section needs no electric power source in order to input a matching data. When the data storage device is connected to the system equipment, the security system receives a matching data from the data input section and decides if the matching data agrees with a reference data provided beforehand. The security system prohibits access to a memory means in the device if the matching data is decided not to agree with the reference data.

8 Claims, 4 Drawing Sheets

```
0 0 0 0 0 0 0 0 0
0 0 1 1 1 1 0 0 0
0 0 1 0 0 1 1 0 0
0 0 0 0 0 1 1 0 0
0 0 0 0 0 1 0 0 0
0 0 0 0 1 1 0 0 0
0 0 1 1 0 0 0 0 0
0 0 1 1 1 1 1 0 0
0 0 0 0 0 0 0 0 0
```

| 2 | 4 | 1 |
|---|---|---|
| 6 | 9 | 3 |
| 5 | 7 | 8 |

5,761,733

1

DATA STORAGE DEVICE WITH SECURITY SYSTEM AND FERROELECTRIC DATA INPUT SECTION

BACKGROUND OF THE INVENTION

1. Field of the Invention

The present invention relates to a data storage device such as a PC card connectable to a system equipment such as a personal computer and having a security function.

2. Description of the Prior Art

As personal computers and network environment become popular, data management comes out as an important problem. No one except users can access data if the data are managed in a server introducing a security system or in a hard disk where a password can be set. However, a security system is not introduced for a detachable storage medium such as a flexible disk or a PC card. Then, if a third party gets a PC card, he or she can access the data in the PC card freely by connecting it to a computer.

Recently, a PC card has a memory capacity as large as, for example, 40 megabytes, and an amount of data which can be stored in a PC card is increasing. However, a security system is not introduced to a PC card except PC cards having a mechanical security system, for example, which uses matching of a password to be input with buttons equipped in the PC card. This is ascribed to a necessity of a power source such as an electric cell in order to activate a security system in a PC card. Prior art security systems as disclosed in Japanese Patent laid open Publication 3-71290 and the like need to have an electric cell mounted therein or an external power source when a key data for data matching is input.

SUMMARY OF THE INVENTION

An object of the present invention is to provide a data storage device having a security system which needs no power source when a matching data is input.

A data storage device such as a PC card connectable to a system equipment comprises a memory means for storing data, and a memory controller for controlling data transfer between the memory means and the system equipment. The device further comprises a security system and a data input section. The data input section comprises cells made of a ferroelectric material for inputting a matching data, and a user can give a matching data before connecting the device to a personal computer or the like. The data input section has a feature that it needs no electric power source in order to input a matching data. When the data storage device is connected to the system equipment, the security system receives the matching data from the data input section and decides if the matching data agrees with a reference data provided beforehand. Then, the security system prohibits access to a memory means in the device if the matching data is decided not to agree with the reference data.

An advantage of the present invention is that no power source is needed for a security system in a data storage device when a matching data is received.

BRIEF DESCRIPTION OF THE DRAWINGS

These and other objects and features of the present invention will become clear from the following description taken in conjunction with the preferred embodiments thereof with reference to the accompanying drawings, and in which.

2

Figure 2:
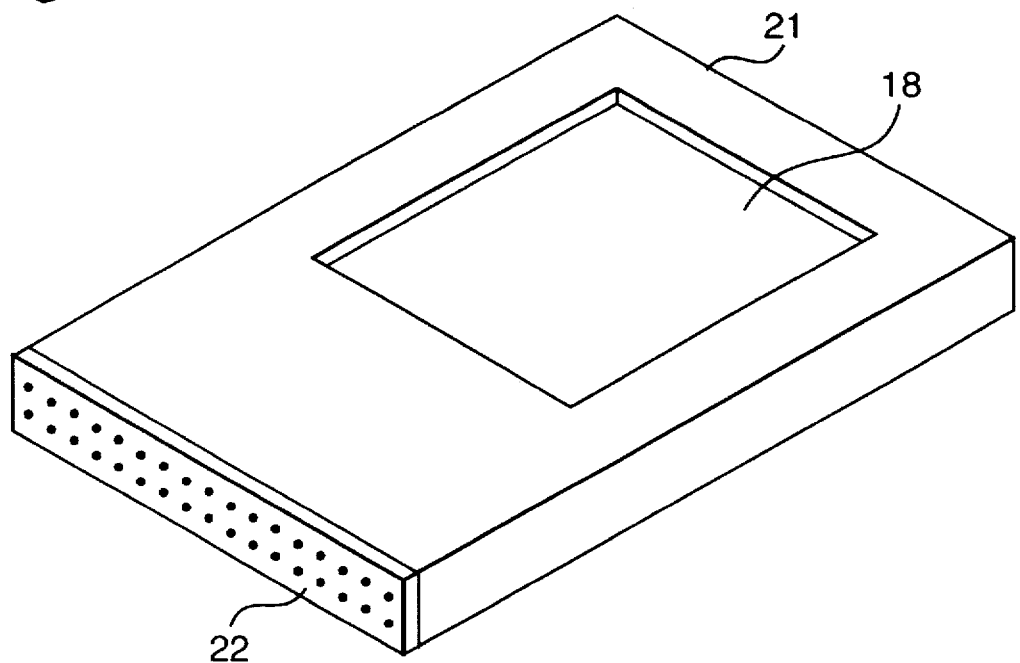
Figure 3:
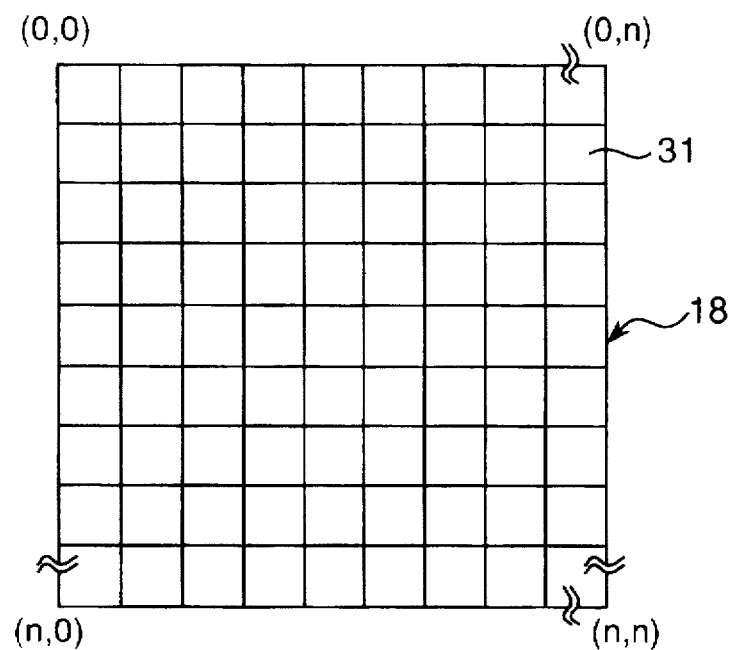
Figure 4:
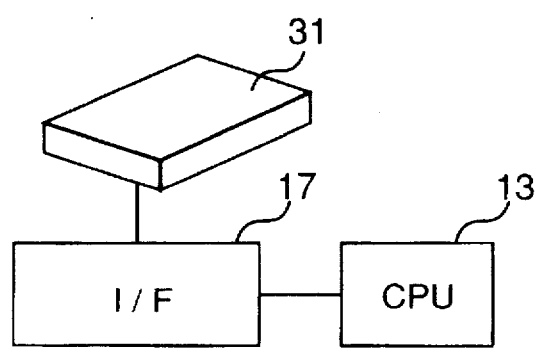
Figures 5, 6, 7:
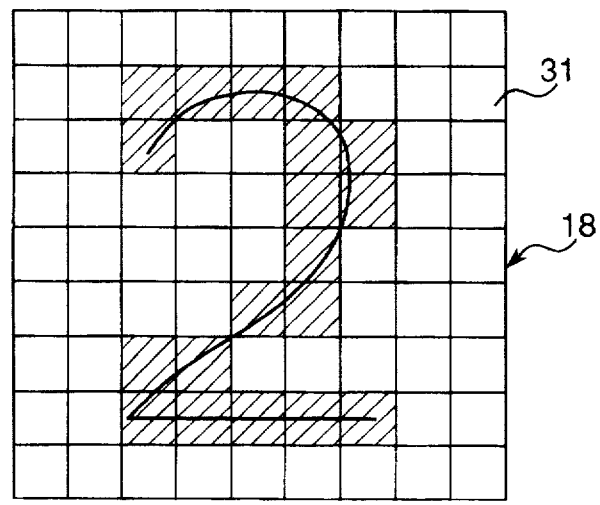
Figure 8:
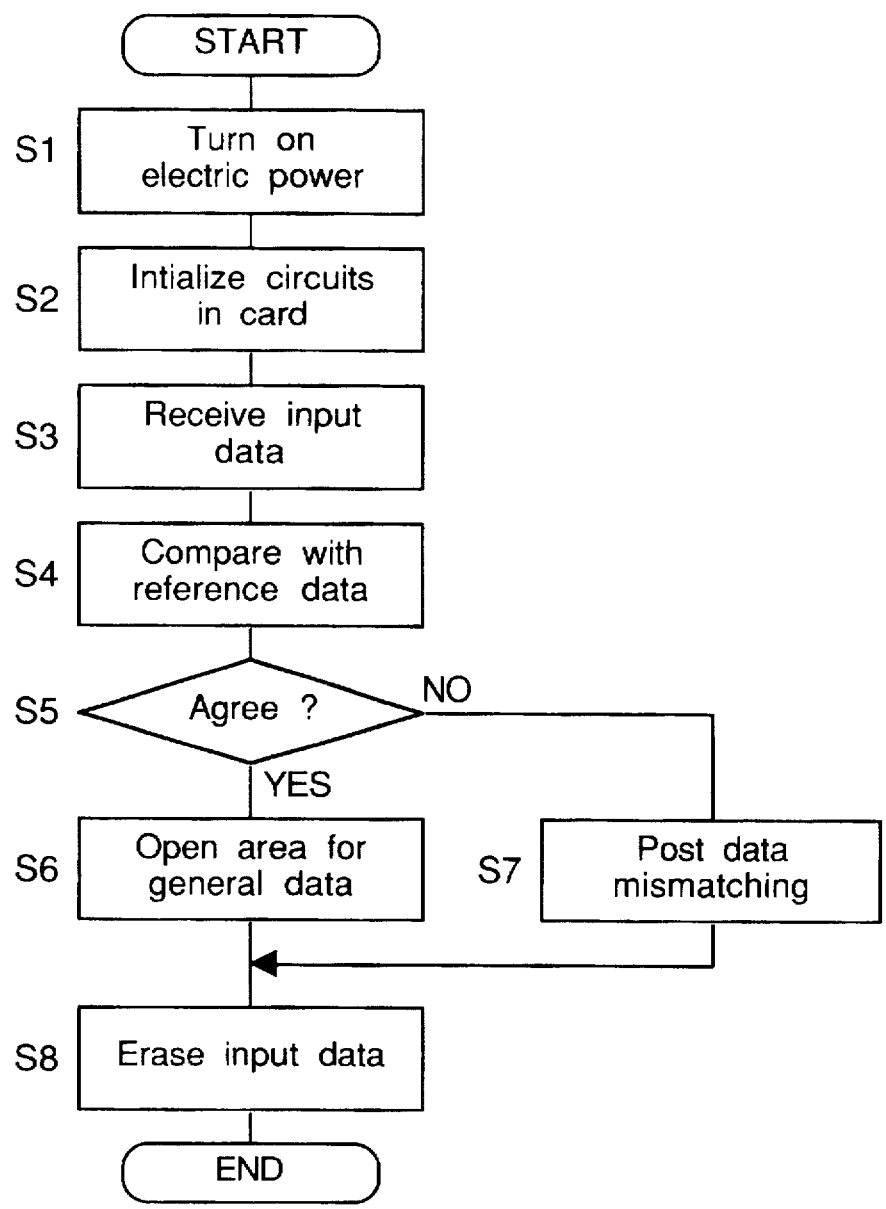

FIG. 2 is a perspective view of a data storage device of the invention;

FIG. 3 is a diagram of cells of an input section comprising a ferroelectric material in the data storage device;

FIG. 4 is a block diagram of for illustrating connection of the input section and an interface therefor;

FIG. 5 is a diagram of charge states in the cells when a data is input in the data input section;

FIG. 6 is a diagram of bit arrays when the data shown in FIG. 5 is input;

FIG. 7 is a diagram of the data input section for illustrating a pattern of data input in an embodiment of the invention; and FIG. 8 is a flowchart of a security system of the data storage device of the invention.

DETAILED DESCRIPTION OF THE PREFERRED EMBODIMENTS

Figure 1:
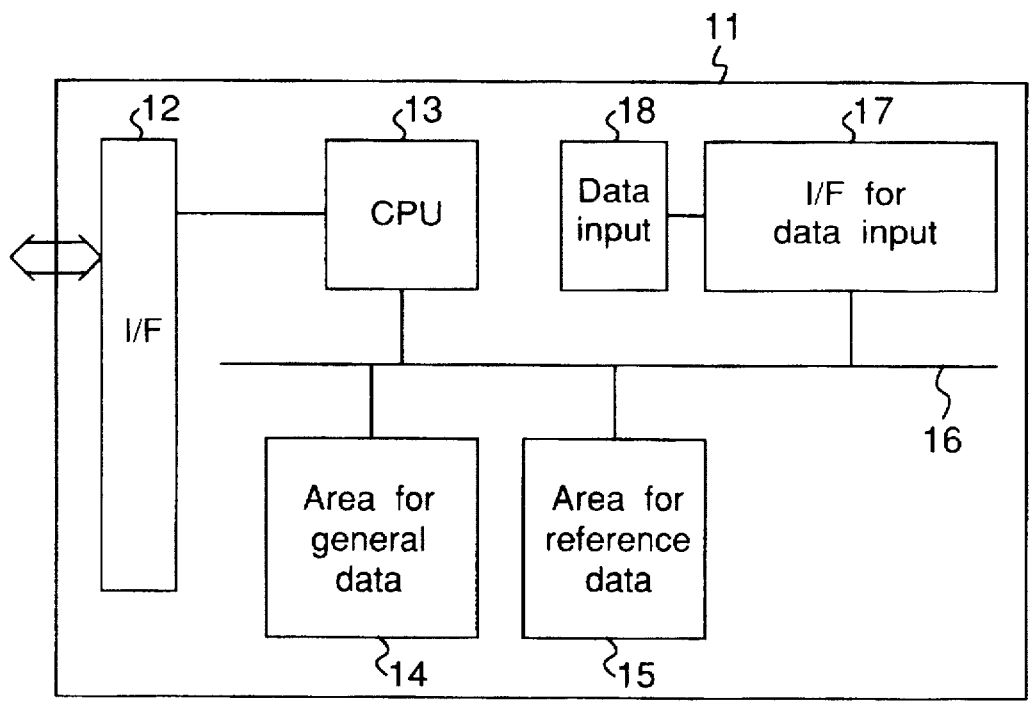
FIG. 1 is a block diagram of a data storage device of the invention.

Referring now to the drawings, wherein like reference characters designate like or corresponding parts throughout the several views, FIG. 1 shows a block diagram of an electric circuit in a PC card 11 as a data storage device of an embodiment according to the invention. A central processing unit (CPU) 13 is connected through a bus 16 to a first memory 14 having a general data area for storing user's data, a second memory 15 having a reference data area for storing a reference data for data matching, and an interface (IF) circuit 17 for a data input section 18. The CPU 13 is connected through the interface circuit 17 with the data input section 18 for inputting a matching data by a user. The interface circuit 17 comprises a data management means and an amplifier for giving a signal of a sufficient output power. The CPU 13 is also connected to an interface (I/F) circuit 12 for data transfer to and from an external personal computer (not shown) or a system equipment.

FIG. 2 is a perspective view of the PC card 11. The PC card 11 comprises a panel 21 including the blocks shown in FIG. 1. A connector 22 for connecting the interface circuit 12 to the external computer. The data input section 18 is provided to be exposed at an upper surface of the panel 21 so that a user can give a matching data. As shown in FIG. 3, the data input section 18 is divided into cells 31 which form a matrix of m lines and n columns, and each cell 31 is made of a ferroelectric material. No charge is given to each cell 31 before data input. In the data input section 18, a user can input a data by a user by giving charges to the ferroelectric material or by touching a surface thereof with a bar or a finger having charges. By using the data input section 18 of the PC card 11 comprises a ferroelectric material, a user can input a data even if the PC card 11 has no internal power source or it is not connected to an external power source.

FIG. 4 illustrates connection of a cell 31 of the data input section 18 in the data input section 18 through the interface 17 to the CPU 13. When a power source is turned on, the CPU 13 scans the cells 31 comprising a ferroelectric material successively through the interface 17 in order to get a matching data formed on all the cells 31, and it decides a data input according to charges in the cells 31. That is, if a cell 31 is in a charged state, the data input is decided to be "1", while if a cell 31 is not in a charged state, the data input is decided to be "0".

When a character of a number "2" is written on the data input section 18 having a matrix of nine lines and nine columns, as shown in FIG. 5, charges are given to cells illustrated with hatching, and the cells having charges correspond to data of "1". On the other hand, the other cells are decided to have data of "0". FIG. 6 shows states of charges in each cell when the data shown in FIG. 5 is input. That is, only the cells charged by a user has data of "1". The input data is converted to a bit array, and it is recognized by the CPU 13.

Next, operation of a security system of the PC card 11 is explained. When the PC card 11 is used, a matching data (or password) is input first with the data input section 18 by giving charges to the ferroelectric material or by touching a surface with a bar or a finger having charges. Because the data input section 18 of the PC card 11 comprises a ferroelectric material, the input data is stored in the ferroelectric material even if the PC card 11 has no internal power source or it is not connected to an external power source.

For example, a matching data is input with a pattern as shown in FIG. 7. In this example, cells of the data input section 18 are divided into nine portions each including a plurality of cells, for example nine cells, and one data is input in each portion. Then, a user can input a password of nine alphanumeric characters. The input characters are recognized with a known pattern recognition technique by extraction and comparing features of the characters.

When data in the PC card 11 is accessed, a data is input first by a user in the data input section 18. Then, the PC card 11 is connected to a PC card slot provided in a personal computer, and an electric power is supplied by a computer to the PC card 11. Then, the CPU 13 in the PC card 11 confirms the input data through the interface 27. Next, data matching is performed by the CPU 13, and it cancels security or allows the PC card 11 to be accessed if the input data is correct.

Next, the matching operation after supply the electric power to the PC card 11 is explained. FIG. 8 shows operation of a security system by the CPU 13. When a PC card 11 having a security system of the invention is connected to a personal computer or the like, an electric power is supplied to the PC card therefrom (step S1). Then, the CPU 13, the interface for data input and the like in the PC card 11 are initialized (step S2). In concrete, self diagnosis of the CPU and the peripherals is performed, the initialization is performed, and the reference data stored in the area 15 is confirmed. Next, a data is received through the interface 17 from the data input section 18 (step S3), and the data is checked in the order of (0, 0) to (0, n) in the matrix of the data input section 18. In the acquisition process, when the first line completes, the next line of (1, 0) to (1, n) is confirmed. This process is repeated to the last line. All the data can be get by this scan. Then, the data is matched with the reference data in the second memory 15 (step S4).

If the data is decided to be matched with the reference data (YES at step S5), the first memory 14 including an area for storing general data is opened (step S6). Then, charges remaining in the data input section 23 (the ferroelectric material) are cleared (step S8), and the processing ends. On the other hand, if the data is not decided to be matched (NO at step S5), the mismatching of the data is posted to a user (step S7). Then, charges remaining in the data input section 18 are cleared or the input data is erased (step S8), and the processing ends.

To sum up, the CPU 13 compares the reference data which has been registered by the user in the second memory 15 with an input matching data given by the data input section 18, and if the input data matches the reference data, the security system is canceled or the first memory 14 is allowed to be accessed by the personal computer.

In the above-mentioned embodiment, an input data for a matching data includes nine alphanumeric characters. However, by decreasing the size of the cells in the data input section, a number of input characters of a data can be increased or a complex pattern or an image can be recognized. Then, a security system having higher reliability can be provided.

As explained above, the security system according to the invention needs no power source when a matching data is input. Then, it can be applied to a detachable medium such as a PC card to be inserted into a slot of a personal computer.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data storage device connectable to a system equipment, the device comprising:

first memory means for storing data;

a memory controller for controlling data transfer between said first memory means and the system equipment;

an unpowered data input section including cells made of a ferroelectric material for inputting matching data; and a security system for receiving the matching data from said data input section and for prohibiting access to said first memory means if the matching data does not agree with reference data when the device is connected to the system equipment.

2. The device according to claim 1, wherein said security system includes second memory means for storing the reference data.

3. The device according to claim 2, wherein said memory controller includes a central processing unit connected through a bus to said first and second memory means, and an interface for said data input section connected through the bus to the central processing unit.

4. The device according to claim 2, said central processing unit scanning the cells of said unpowered data input section to detect charges.

5. The device according to claim 4, said central processing unit deciding whether the detected charge of the cell represents a first or a second binary state.

6. The device according to claim 1, wherein the cells in said data input section form an array of a matrix.

7. The device according to claim 1, wherein said security system receives the matching data of "1" for cells having electric charges and of "0" for the other cells.

8. The device according to claim 1, wherein said security system further includes decision means for comparing the matching data with the reference data, and prohibition means for prohibiting access to said first memory means when said decision means decides that the matching data does not match with the reference data.

* * * * *